US011880681B2

(12) United States Patent
Azuma et al.

(10) Patent No.: US 11,880,681 B2
(45) Date of Patent: Jan. 23, 2024

(54) SOFTWARE ANALYSIS APPARATUS

(71) Applicant: Mitsubishi Electric Corporation, Tokyo (JP)

(72) Inventors: Taishi Azuma, Tokyo (JP); Yuki Hikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 134 days.

(21) Appl. No.: 17/762,853

(22) PCT Filed: Oct. 21, 2019

(86) PCT No.: PCT/JP2019/041331
§ 371 (c)(1),
(2) Date: Mar. 23, 2022

(87) PCT Pub. No.: WO2021/079408
PCT Pub. Date: Apr. 29, 2021

(65) Prior Publication Data
US 2022/0276864 A1     Sep. 1, 2022

(51) Int. Cl.
*G06F 8/75* (2018.01)
*G06F 3/14* (2006.01)
(52) U.S. Cl.
CPC . *G06F 8/75* (2013.01); *G06F 3/14* (2013.01)
(58) Field of Classification Search
CPC ..................................... G06F 8/75; G06F 3/14
See application file for complete search history.

(56) References Cited

U.S. PATENT DOCUMENTS

2009/0089753 A1*  4/2009  Yoshimura ............... G06F 8/75
                                                              717/121

FOREIGN PATENT DOCUMENTS

| JP | 2001290639 A | 10/2001 |
| JP | 2009295079 A | * 12/2009 |
| JP | 2018073054 A | 5/2018 |

OTHER PUBLICATIONS

David Binkley "Source Code Analysis: A Road Map" (Year: 2007).*

(Continued)

*Primary Examiner* — Phillip H Nguyen
(74) *Attorney, Agent, or Firm* — BUCHANAN INGERSOLL & ROONEY PC

(57) ABSTRACT

According to the present invention, an analysis unit configured to analyze weights of a plurality of structural elements included in the structural information and weights of dependency relationships of each of the plurality of structural elements based on the structural information and a plurality of execution histories, a structural element designation unit configured to designate one of the structural element among the structural elements included in the structural information as a designated structure element, a display information calculation unit configured to calculate display information including a dependency structural element being a structural element having a dependency relationship with the designated structure element and a weight of the dependency structural element, and a correspondence between the designated structural element and the dependency structural element and a weight of the correspondence, and a display configured to display the display information.

6 Claims, 24 Drawing Sheets

(56) References Cited

OTHER PUBLICATIONS

Mazlami et al., "Extraction of Microservices from Monolithic Software Architectures" (Year: 2017).*
Zhen-qiang et al., "Dependence Analysis Based on Dynamic Slicing for Debugging" (Year: 2000).*
Martin P. Robillard "Topology Analysis of Software Dependencies" (Year: 2008).*
International Search Report (PCT/ISA/210) with translation and Written Opinion (PCT/ISA/237) dated Jan. 21, 2020, by the Japan Patent Office as the International Searching Authority for International Application No. PCT/JP2019/041331. (8 pages).

\* cited by examiner

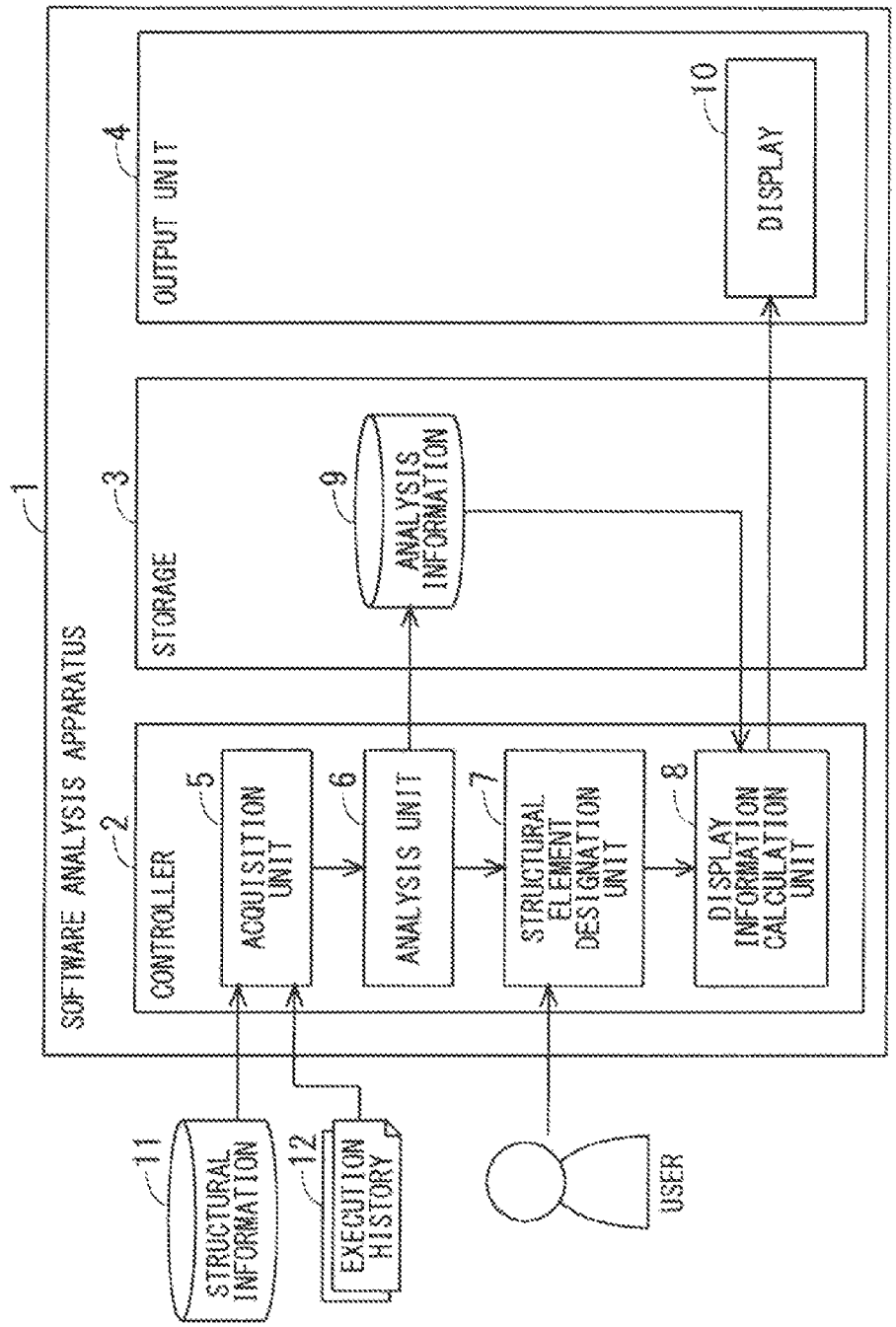
F I G. 1

F I G. 2

FUNCTION LIST — 11, 13

| No. | EXECUTION FUNCTION NAME |
|---|---|
| 1 | Func_A |
| 2 | Func_B |
| 3 | Func_C |
| 4 | Func_D |
| 5 | Func_E |

DEPENDENCY RELATIONSHIP LIST — 14

| No. | DEPENDENCY SOURCE | DEPENDENCY DESTINATION |
|---|---|---|
| 1 | Func_A | Func_B |
| 2 | Func_A | Func_D |
| 3 | Func_B | Func_C |
| 4 | Func_B | Func_E |
| 5 | Func_D | Func_E |

FIG. 4

FUNCTION TABLE

| No. | EXECUTION FUNCTION NAME | EXECUTION COUNT A | EXECUTION COUNT B |
|---|---|---|---|
| 1 | Func_A | 2 | 1 |
| 2 | Func_B | 2 | 1 |
| 3 | Func_C | 1 | 0 |
| 4 | Func_D | 0 | 0 |
| 5 | Func_E | 0 | 1 |

DEPENDENCY RELATIONSHIP TABLE

| No. | DEPENDENCY SOURCE | DEPENDENCY DESTINATION | EXECUTION COUNT A | EXECUTION COUNT B |
|---|---|---|---|---|
| 1 | Func_A | Func_B | 2 | 1 |
| 2 | Func_A | Func_D | 0 | 0 |
| 3 | Func_B | Func_C | 1 | 0 |
| 4 | Func_B | Func_E | 0 | 1 |
| 5 | Func_D | Func_E | 0 | 0 |

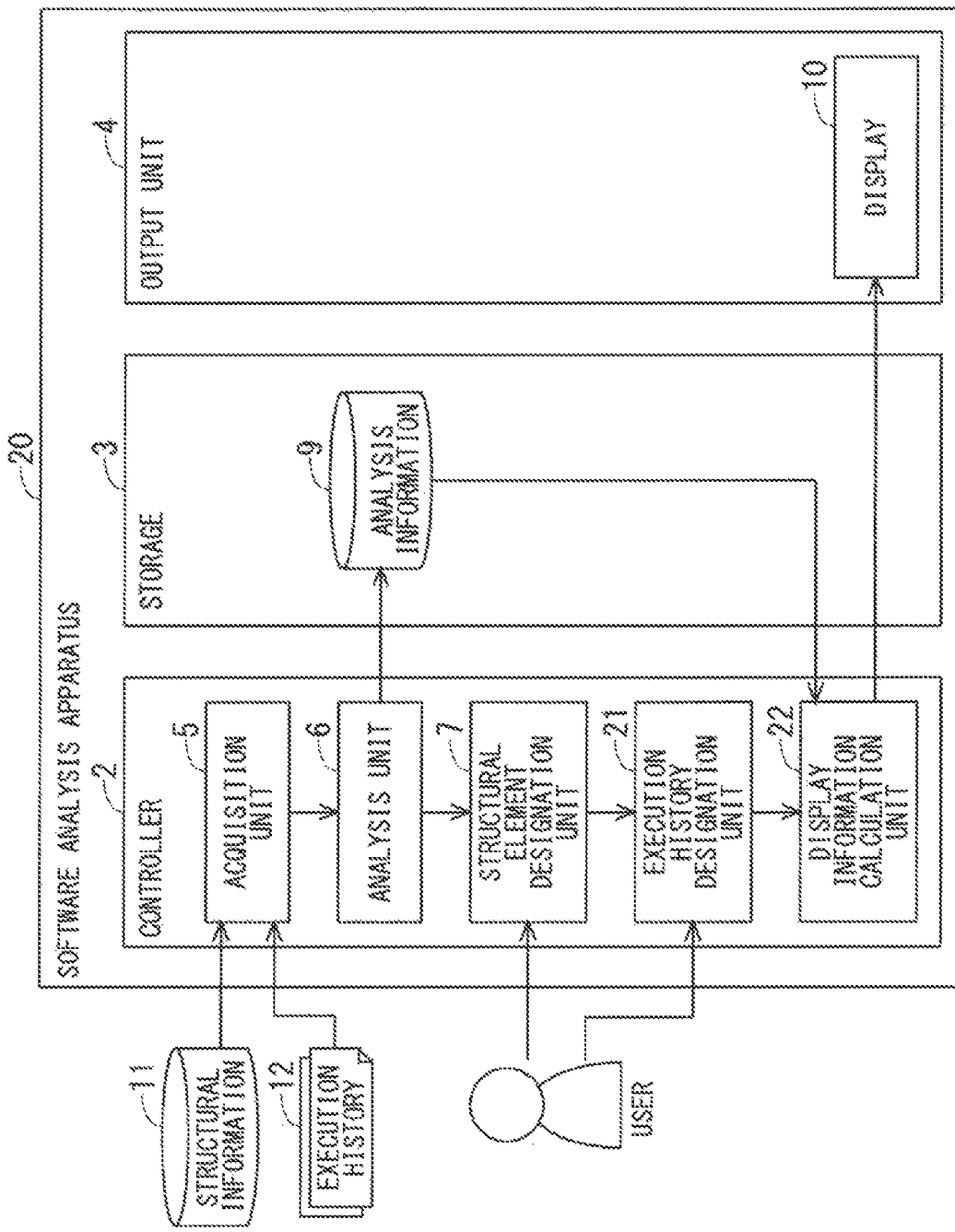
F I G. 8

FIG. 9

| FUNCTION NAME | Func_B |
|---|---|
| PLURALITY OF EXECUTION HISTORIES | ☑ EXECUTION HISTORY A<br>☐ EXECUTION HISTORY B |

FIG. 11

| FUNCTION NAME | Func_B |
|---|---|
| PLURALITY OF EXECUTION HISTORIES | ☐ EXECUTION HISTORY A<br>☑ EXECUTION HISTORY B |

F I G. 14

| FUNCTION NAME | Func_B |
|---|---|
| PLURALITY OF EXECUTION HISTORIES | ☑ EXECUTION HISTORY A<br>☑ EXECUTION HISTORY B |

FIG. 19

| FUNCTION NAME | Func_B |
|---|---|
| FIRST EXECUTION HISTORY | ☑ EXECUTION HISTORY A<br>☐ EXECUTION HISTORY B |
| SECOND EXECUTION HISTORY | ☐ EXECUTION HISTORY A<br>☑ EXECUTION HISTORY B |

SOFTWARE ANALYSIS APPARATUS

TECHNICAL FIELD

The present invention relates to a software analysis apparatus that analyzes software.

BACKGROUND ART

In software development, diversion development on a large scale and with short delivery times has become the norm. In addition, if the customer's requirements change during the software development process, the creation and revision of documents such as specifications for the changed software development may be omitted in order to focus the work on the changed software development. In such a situation where there is a lack of documents for the changed software development, when another developer participates in the development of such software, the other developer needs to understand the existing software without checking the documents.

The most common way to understand existing software has been for the developer per se to read and check the source code. However, when the developer per se reads and checks the source code, there has been a concern that not all the source code was grasped because of the many man-hours required for checking. Whereas, a technique has been developed to display the software structure obtained by static analysis of the source code as a graph. According to the technique, the developer can understand the software structure at a glance without having to read and check the source code. In addition, a technique has been developed in which the source code is executed and a dynamic analysis of the flow of processing of the software is conducted. According to the technique, the developer can understand the flow of processing of the software at a glance without having to read and check the source code.

For example, a technique for simplifying and visualizing the structural information and the impact range of software is disclosed (see, for example, Patent Document 1). Here, the impact range indicates the range of another function having a dependency relationship with a certain function.

Also, a technique is disclosed in which an execution count of dependency relationships of software is calculated based on the structural information and the execution history information of the software, and a part of the dependency relationship having a large execution count is highlighted and displayed on the call graph (For example, see Patent Document 2).

PRIOR ART DOCUMENTS

Patent Documents

Patent Document 1: Japanese Patent Application Laid-Open No. 2018-73054
Patent Document 2: Japanese Patent Application Laid-Open No. 2001-290639

SUMMARY

Problem to be Solved by the Invention

In order for the mentioned other developer to understand the flow of processing of existing software, the overall flow of processing of the software needs to be grasped. However, with the conventional technique, only one execution history which is a result of dynamic analysis with respect to one piece of structural information of the software can be displayed. By displaying only one execution history in this manner, the developer can grasp only a part of the software. Moreover, even if the execution history passes through a different path than usual, it is difficult for the developer to grasp this.

In the technique disclosed in Patent Document 1, the impact range is highlighted to make it facilitate for the developer to grasp the impact range. However, Patent Document 1 does not mention dynamic analysis of software; therefore, a problem has been posed where the developer cannot understand the flow of processing of the software. Further, Patent Document 2 does not mention the analysis of a plurality of pieces of execution history information, a problem is posed where the developer can grasp only a part of the software. As described above, with the conventional technique, it cannot be said that the developer can easily grasp the entire software, and there is room for improvement.

The present invention has been made to solve such a problem, and an object of the present invention is to provide a software analysis apparatus capable of easily grasping the entire software by a developer.

Means to Solve the Problem

In order to solve the above problem, according to the present invention, a software analysis apparatus includes an acquisition unit configured to acquire structural information of software and a plurality of execution histories of the software, an analysis unit configured to analyze weights of a plurality of structural elements included in the structural information and weights of dependency relationships of each of the plurality of structural elements based on the structural information and the plurality of execution histories acquired by the acquisition unit, a structural element designation unit configured to designate one of the structural element among the structural elements included in the structural information as a designation structure element, a display information calculation unit configured to calculate display information including a dependency structural element being a structural element having a dependency relationship with the designated structure element and a weight of the dependency structural element, and a correspondence between the designated structural element and the dependency structural element and a weight of the correspondence, and a display configured to display the display information calculated by the display information calculation unit.

Effects of the Invention

According to the present invention, the software analysis apparatus includes the analysis unit configured to analyze the weights of the plurality of structural elements included in the structural information and the weights of dependency relationships of each of the plurality of structural elements based on the structural information and the plurality of execution histories acquired by the acquisition unit, the structural element designation unit configured to designate one of the structural element among the structural elements included in the structural information as a designated structure element, the display information calculation unit configured to calculate display information including the dependency structural element being the structural element having the dependency relationship with the designated structure element and the weight of the dependency structural element, and the correspondence between the designated structural element and the dependency structural element and the weight of the correspondence, and the display configured to display the display information calculated by the display information calculation unit; therefore, the developers can to easily understand the entire software.

The objects, features, aspects, and advantages of the present invention will become more apparent from the following detailed description and the accompanying drawings.

BRIEF DESCRIPTION OF DRAWINGS

FIG. 1 is a block diagram illustrating an example of a configuration of a software analysis apparatus according to the first embodiment of the present invention.

FIG. 2 is a diagram illustrating an example of a configuration of structural information according to the first embodiment of the present invention.

FIG. 4 is a diagram illustrating an example of analysis information according to the first embodiment of the present invention.

FIG. 8 is a block diagram illustrating an example of a configuration of a software analysis apparatus according to the second embodiment of the present invention.

FIG. 9 is a diagram illustrating an example of designation of an execution history according to the second embodiment of the present invention.

FIG. 11 is a diagram illustrating an example of designation of an execution history according to the second embodiment of the present invention.

FIG. 14 is a diagram illustrating an example of designation of an execution history according to the third embodiment of the present invention.

FIG. 19 is a diagram illustrating an example of designation of execution histories according to the fifth embodiment of the present invention.

DESCRIPTION OF EMBODIMENT(S)

Figure 3:
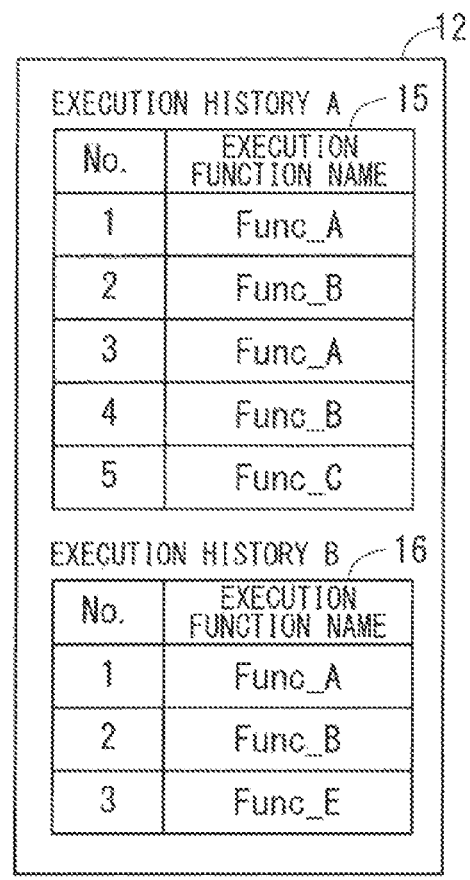
FIG. 3 is a diagram illustrating an example of plurality of execution histories according to the first embodiment of the present invention.

The embodiments of the present invention will be described below with reference to the drawings.

First Embodiment

FIG. 1 is a block diagram illustrating an example of a configuration of a software analysis apparatus 1 according to the first embodiment of the present invention. As illustrated in FIG. 1, the software analysis apparatus 1 includes a controller 2, a storage 3, and an output unit 4.

The controller 2 includes an acquisition unit 5, an analysis unit 6, a structural element designation unit 7, and a display information calculation unit 8.

The acquisition unit 5 acquires structural information 11 of software and a plurality of execution histories 12 of the software. The execution history 12 represents the flow of processing when the software is executed. The user can designate the structural information 11 and the plurality of execution histories 12 to be acquired by the acquisition unit 5. The user can designate the structural information 11 and the plurality of execution histories 12 of the software to be analyzed. The user represents, for example, a software developer.

Here, the structural information 11 and the plurality of execution histories 12 will be described.

FIG. 2 is a diagram illustrating an example of the structural information 11. As illustrated in FIG. 2, the structural information 11 includes a function list 13 and a dependency relationship list 14.

In the function list 13, all the functions (execution functions) included in the software to be analyzed are illustrated. And in the dependency relationship list 14, all the dependency relationships included in the software to be analyzed are illustrated. Specifically, in the dependency relationship list 14, the execution function names of the dependency sources and the execution function names of the dependency destinations are associated with each other. Such functions and dependency relationships can be obtained by using known static analysis tools. The function is also referred to as a structural element.

FIG. 3 is a diagram illustrating an example of the plurality of execution histories 12. As illustrated in FIG. 3, the plurality of execution histories 12 include an execution history A15 and an execution history B16. In each of the execution history A15 and the execution history B16, a list of functions executed (list of called functions) when the software to be analyzed was executed is shown in the order of execution. Such functions can be obtained by using known dynamic analysis tools. Further, for example, by analyzing before and behind of execution functions as in No. 1, and No. 2, and No. 2 and No. 3 in the execution history A15, the dependency relationships of the execution functions can be analyzed.

Returning to the explanation of FIG. 1, the analysis unit 6 analyzes the execution count of each function and the execution count of the dependency relationship for each execution history based on the structural information 11 and the plurality of execution histories 12 acquired by the acquisition unit 5. Then, the analysis unit 6 stores the analysis result in the storage 3 as the analysis information 9.

FIG. 4 is a diagram illustrating an example of the analysis information 9 stored in the storage 3. As illustrated in FIG. 4, the analysis information 9 includes a function table 17 and a dependency relationship table 18. In FIG. 4, "Execution Count A" indicates the execution count of each function in the execution history A15. Also, "Execution Count B" indicates the execution count of each function in the execution history B16.

In the function table 17, the total value of the execution count of each function is stored for each execution history. In the dependency table 18, the total value of the execution count of each dependency relationship is stored for each execution history.

Figure 5:
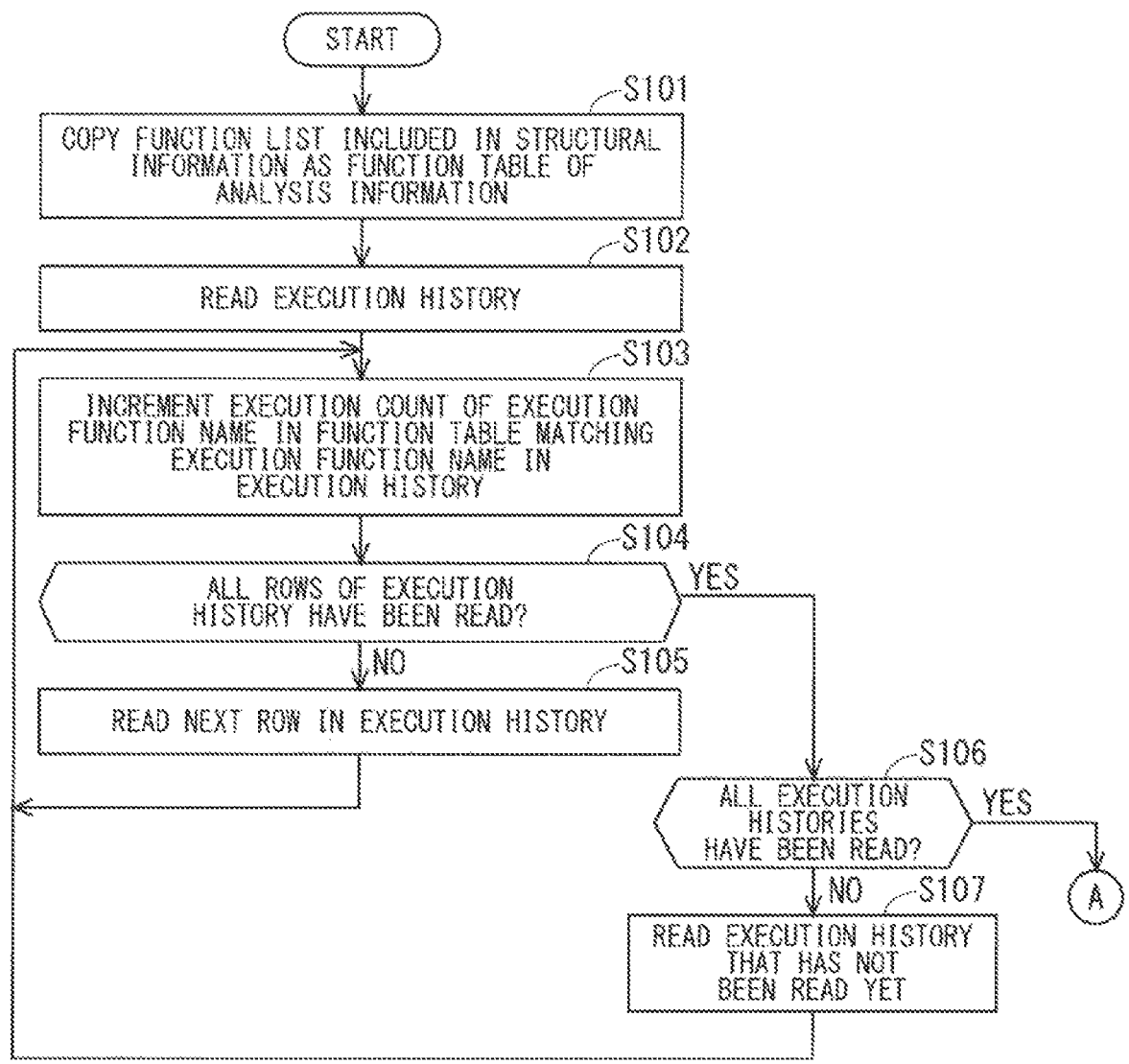
FIG. 5 is a flowchart illustrating an example of operation of an analysis unit according to the first embodiment of the present invention.
Figure 6:
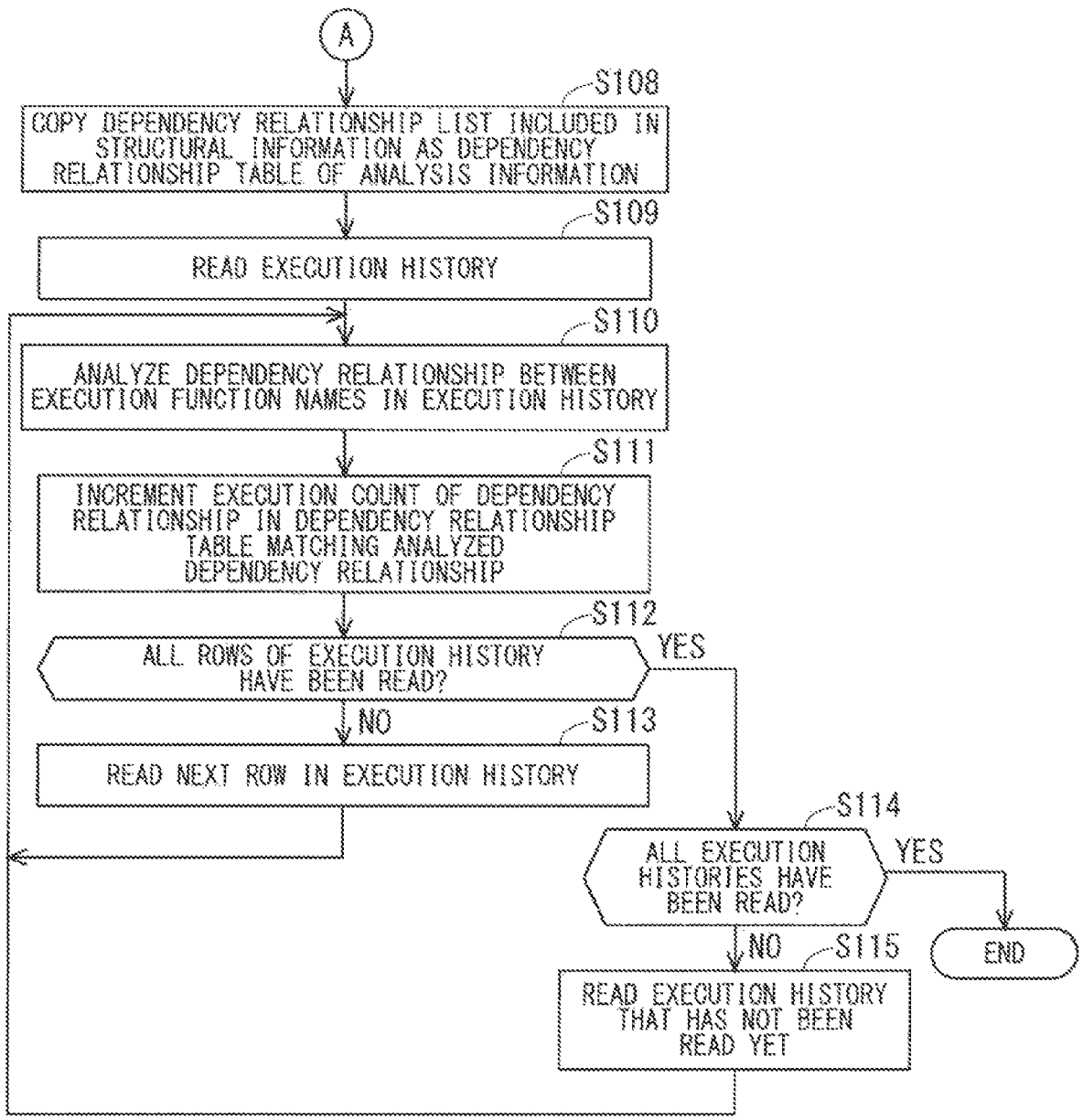
FIG. 6 is a flowchart illustrating an example of operation of the analysis unit according to the first embodiment of the present invention.

FIGS. 5 and 6 are flowcharts illustrating an example of the operation of the analysis unit 6. Hereinafter, the operation of the analysis unit 6 will be described with reference to FIGS. 2 to 3.

In Step S101, the analysis unit 6 copies the function list 13 included in the structural information 11 as the function table 17 of the analysis information 9.

In Step S102, the analysis unit 6 reads one execution history among the plurality of execution histories 12 acquired by the acquisition unit 5. For example, the analysis unit 6 reads the execution history A15 among the plurality of execution histories 12.

In Step S103, the analysis unit 6 reads the execution function on the first row in the execution history read in Step S102. Then, the analysis unit 6 increments the execution count of the execution function name in the function table 17, which matches the execution function name in the first row. For example, the analysis unit 6 reads "Func_A" of "No. 1" in the execution history A15. Then, the analysis unit 6 increments "Execution Count A" of "Func_A" by "1" in the function table 17, which matches the "Func_A" of "No. 1" in the execution history A15. When the next row is read in Step S105 described later, the analysis unit 6 reads the execution function of the row read in Step S105.

In Step S104, the analysis unit 6 determines whether or not all the rows of the execution history in Step S102 have been read. When all the rows of the execution history have been read, the process proceeds to Step S106. Meanwhile, when all the rows of the execution history have not been read, the process proceeds to Step S105.

In Step S105, the analysis unit 6 reads the execution function name on the next row in the execution history read in Step S103. For example, the analysis unit 6 reads "Func_B" of "No. 2" in the execution history A15. After that, the process returns to Step S103.

In Step S106, the analysis unit 6 determines whether or not all the plurality of execution histories 12 acquired by the acquisition unit 5 in Step S102 have been read. When all the plurality of execution histories 12 have been read, the process proceeds to Step S108. Meanwhile, when all the plurality of execution histories 12 have not been read, the process proceeds to Step S107.

In Step S107, the analysis unit 6 reads an execution history that has not been read yet among the plurality of execution histories 12 acquired by the acquisition unit 5. For example, the analysis unit 6 reads the execution history B16 among the plurality of execution histories 12. After that, the process returns to Step S103.

In Step S108, the analysis unit 6 copies the dependency relationship list 14 included in the structural information 11 as the dependency relationship table 18 of the analysis information 9.

In Step S109, the analysis unit 6 reads one execution history among the plurality of execution histories 12 acquired by the acquisition unit 5. For example, the analysis unit 6 reads the execution history A15 among the plurality of execution histories 12.

In Step S110, the analysis unit 6 reads each of the execution functions on the first row and the second row in the execution history read in Step S109. Then, the analysis unit 6 analyzes the dependency relationship between each of the read execution functions. For example, the analysis unit 6 reads "Func_A" of "No. 1" and "Func_B" of "No. 2" in the execution history A15. Then, the analysis unit 6 analyzes the dependency relationship between "Func_A" and "Func_B". When the next row is read in Step S113 described later, the analysis unit 6 reads each of the execution functions of the row read in Step S113 and the next row.

In Step S111, the analysis unit 6 increments the execution count of the dependency relationship in the dependency relationship table 18, which matches the dependency relationship analyzed in Step S110. For example, the analysis unit 6 increments the "Execution Count A" of "No. 1" in the dependency relationship table 18 by "1" that matches the dependency relationship between "Func_A" and "Func_B" in the execution history A15.

In Step S112, the analysis unit 6 determines whether or not all the rows of the execution history read in Step S109 have been read. When all the rows of the execution history have been read, the process proceeds to Step S114. Meanwhile, when all the rows of the execution history have not been read, the process proceeds to Step S113.

In Step S113, the analysis unit 6 reads the execution function name on the next row in the execution history read in Step S109. For example, the analysis unit 6 reads "Func_B" of "No. 2" in the execution history A15. After that, the process returns to Step S110.

In Step S114, the analysis unit 6 determines whether or not all the plurality of execution histories 12 acquired by the acquisition unit 5 in Step S109 have been read. When all the plurality of execution histories 12 have been read, the process ends. Meanwhile, when all the plurality of execution histories 12 have not been read, the process proceeds to Step S115.

In Step S115, the analysis unit 6 reads an execution history that has not been read yet among the plurality of execution histories 12 acquired by the acquisition unit 5 in Step S109. For example, the analysis unit 6 reads the execution history B16 among the plurality of execution histories 12. After that, the process returns to Step S110.

From the above, in the example of FIG. 4, the total value of the execution count of each function in the execution history A15 is stored in the execution count A of the function table 17, and the total value of the execution count of each function in the execution history B16 is stored in the execution count B of the function table 17. Also, the total value of the execution count of the dependency relationship of each function in the execution history A15 is stored in the execution count A of the dependency relationship table 18, and the total value of the execution count of the dependency relationship of each function in the execution history B 16 is stored in the execution count B of the dependency relationship table 18.

Returning to the explanation of FIG. 1, the structural element designation unit 7 designates one function in each functions included in the structural information 11 acquired by the acquisition unit 5. Specifically, the structural element designation unit 7 designates one function selected by the user. The function designated by the structural element designation unit 7 is also referred to as a designated structural element.

Using the analysis information 9, the display information calculation unit 8 calculates display information including a function having a dependency relationship with the function designated by the structural element designation unit 7 and the weight of the function, and a correspondence between the function designated by the structural element designated unit 7 and the function having the dependency relationship and the weight of the correspondence.

For example, for the execution count A in the function table 17, when the value of the execution count is used as the weight of each execution function, the weights of "Func_A" and "Func_B" are "2", respectively, and the weight of "Func_C" is "1". Further, for the execution count A in the dependency relationship table 18, when the value of the execution count is used as a weight of each dependency relationship, the weight of the dependency relationship where the dependency source is "Func_A" and the dependency destination is "Func_B" is "2", and the dependency weight where the dependency source is "Func_B" and the dependency destination is "Func_C" is "1". The display information calculation unit 8 calculates the weights of each of such a function and a dependency relationship as display information.

The display 10 displays the display information calculated by the display information calculation unit 8. Specifically, the display 10 displays each function and their weights, and the dependency relationship of each function and their weights calculated by the display information calculation unit 8 as illustrated on the graph.

Figure 7:
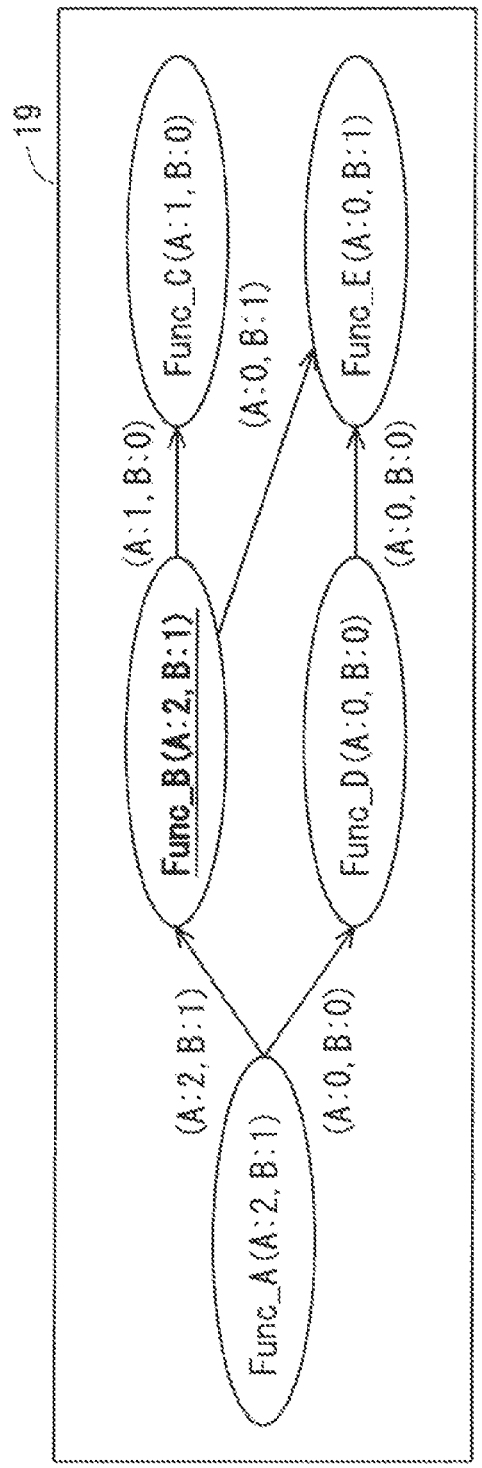
FIG. 7 is an example of a graph a display displays according to the first embodiment of the present invention.

FIG. 7 is an example of the graph 19 displayed by the display 10. The graph 19 is a call graph. Note that the example of FIG. 7 illustrates a case where the structural element designation unit 7 designates "Func_B" as the function name.

As illustrated in FIG. 7, the display 10 shows, on a call graph, a plurality of functions including "Func_B" and their weights, the dependency relationship of each function and their weights provided by the display information calculation unit 8. In FIG. 7, for example, "Func_B (A:2, B:1)" shows that, for the function name "Func_B", the weight of the execution count A of is "2" and the weight of the execution count B is "1". Further, for example, "(A:1, B:0)" between "Func_B" and "Func_C" shows that, for the dependency relationship where the dependency source is "Func_B" and the dependency destination is "Func_C", the weight of the execution count A of is "1" and the weight of the execution count B is "0".

From the above, according to the first embodiment, analyses of the execution histories of the following (1) to (3) can be conducted by using the plurality of execution histories 12.
  (1) Analysis, with a plurality of execution histories of software, having divided in the middle being combined, is conducted, and the analysis result thereof is displayed.
  (2) Analysis of a plurality of execution histories on which the same operation has been executed is conducted, and the analysis result thereof is displayed.
  (3) Analysis of execution histories on which a plurality of developers has executed operation is conducted, and the analysis result thereof is displayed.

When analyzing the impact range using the execution history, the execution count (weight) may not be accurate with only one execution history. When a certain operation is executed, typically, the execution count (weight) of each of the execution function and the dependency relationship is not large; however, if the processing route is different from the normal route for some reason, the weight becomes large as an analysis result. The more the execution histories serving as samples, the smaller the deviation in the inaccuracy of the obtained weights, and accurate weights can be obtained. According to the first embodiment, the analysis of a plurality of execution histories can be conducted; therefore, weights with higher accuracy than those of the conventional technique can be obtained. This allows developers to easily understand the entire software.

Second Embodiment

FIG. 8 is a block diagram illustrating an example of a configuration of a software analysis apparatus 20 according to the second embodiment of the present invention.

As illustrated in FIG. 8, the software analysis apparatus 20 includes an execution history designation unit 21 and a display information calculation unit 22. Other basic configurations and operations thereof are the same as those in the first embodiment; therefore, detailed description thereof will be omitted here.

The execution history designation unit 21 designates one execution history to be used in the analysis among the plurality of execution histories 12 acquired by the acquisition unit 5. Specifically, the execution history designation unit 21 designates one execution history selected by the user. The execution history designated by the execution history designation unit 21 is also referred to as a designated execution history.

FIG. 9 is a diagram illustrating an example of designation of the execution history. The user refers to a selection screen for the execution histories illustrated in FIG. 9 displayed on a display (not illustrated), and selects one execution history. In the example of FIG. 9, the execution history A is selected. In this case, the execution history designation unit 21 designates the execution history A. Note that "Func_B" in FIG. 9 indicates that the function designated by the structural element designation unit 7 is "Func_B". Further, the selection screen illustrated in FIG. 9 may be displayed on the display 10.

The display information calculation unit 22 calculates the display information in one execution history designated by the execution history designation unit 21.

For example, when the execution history designation unit 21 designates the execution history A15, the display information calculation unit 22 calculates the display information weighed by values of the execution count A of each of the function table 17 and the dependency table 18 included in the analysis information 9. At this time, the display information calculation unit 22 does not calculate the weight related to the execution count B. That is, the display information calculated by the display information calculation unit 22 does not include the weight related to the execution count B.

Figure 10:
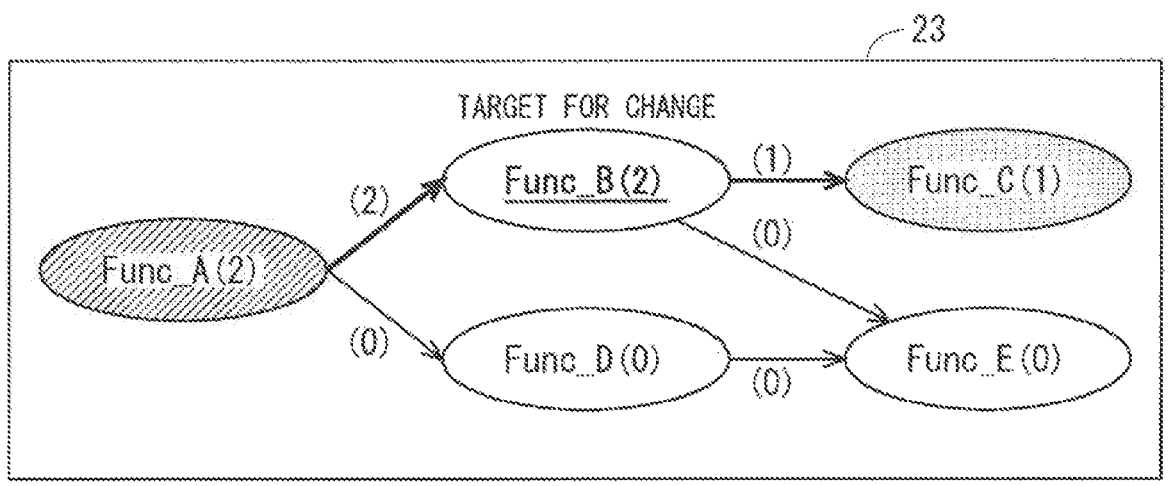
FIG. 10 is an example of a graph a display displays according to the second embodiment of the present invention.

FIG. 10 is an example of the graph 23 displayed by the display 10. The graph 23 is a call graph. Note that the example of FIG. 10 shows, as illustrated in FIG. 9, a case where the structural element designation unit 7 designates "Func_B" as the function name and the execution history designation unit 21 designates "Execution History A".

In FIG. 10, for example, "Func_B (2)" shows that the weight of the execution count A of the function name "Func_B" is "2". Further, for example, "(1)" between "Func_B" and "Func_C" shows that the weight of the execution count A of the dependency relationship where the dependency source is "Func_B" and the dependency destination is "Func_C" is "1".

As illustrated in FIG. 10, the display 10 displays the node of the function in a darker color as the weight of the function increases. Further, the display 10 displays arrow lines, with making the thickness of the arrows thicker as the weight of the dependency becomes greater. This allows improvement in the noticeability for the user for each weight.

FIG. 11 is a diagram illustrating an example of designation of the execution history. The user refers to a selection screen for the execution histories illustrated in FIG. 11, and selects one execution history. In the example of FIG. 11, the execution history B is selected. In this case, the execution history designation unit 21 designates the execution history B.

Figure 12:
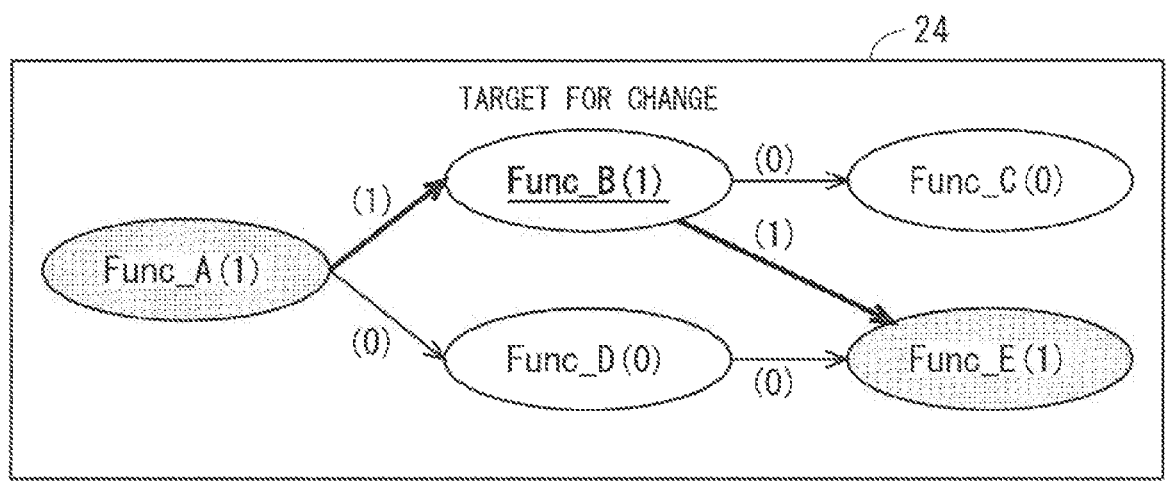
FIG. 12 is an example of a graph a display displays according to the second embodiment of the present invention.

FIG. 12 is an example of the graph 24 displayed by the display 10. The graph 24 is a call graph. Note that the example of FIG. 12 illustrates, as illustrated in FIG. 11, a case where the structural element designation unit 7 designates "Func_B" as the function name and the execution history designation unit 21 designates "Execution History B".

In FIG. 12, for example, "Func_B (1)" shows that the weight of the execution count B of the function name "Func_B" is "1". Further, for example, "(0)" between "Func_B" and "Func_C" shows that the weight of the execution count B of the dependency relationship where the dependency source is "Func_B" and the dependency destination is "Func_C" is "0". The deepness of color of the node of the function and the thickness of the arrow line indicating the dependency relationship in FIG. 12 may be determined by the same method as in FIG. 10.

From the above, according to the second embodiment, the analysis result of the execution history selected by the user from the plurality of execution histories 12 can be displayed. Consequently, when displaying different execution histories, the user can check the analysis result of the desired execution history only by switching the execution history in the execution history designation unit 21, without performing the analysis again.

Third Embodiment

Figure 13:
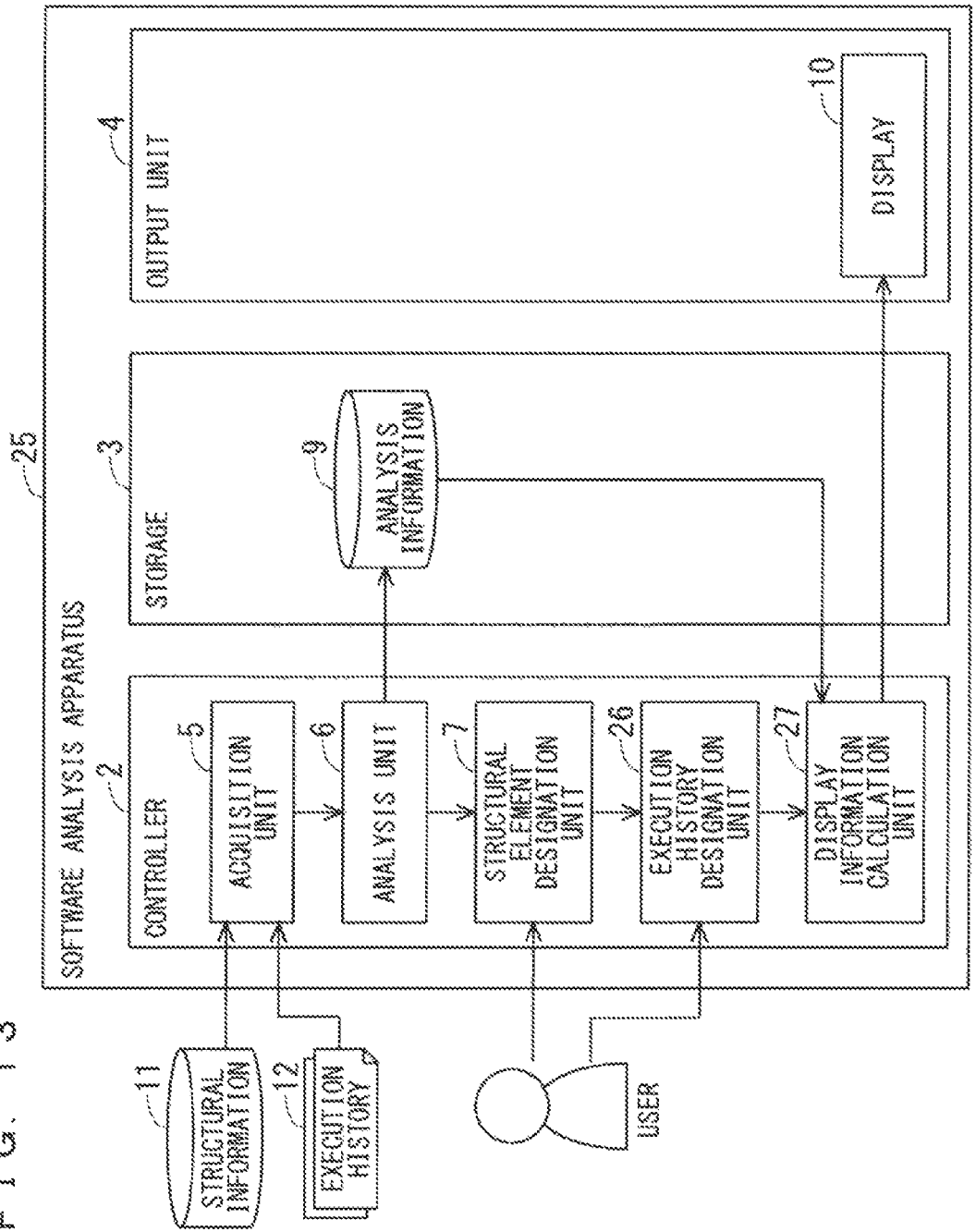
FIG. 13 is a block diagram illustrating an example of a configuration of a software analysis apparatus according to the third embodiment of the present invention.

FIG. 13 is a block diagram illustrating an example of a configuration of a software analysis apparatus 25 according to the third embodiment of the present invention.

As illustrated in FIG. 13, the software analysis apparatus 25 includes an execution history designation unit 26 and a display information calculation unit 27. Other basic configurations and operations thereof are the same as those in the second embodiment; therefore, detailed description thereof will be omitted here.

The execution history designation unit 26 designates a plurality of execution histories to be used in the analysis among the plurality of execution histories 12 acquired by the acquisition unit 5. Specifically, the execution history designation unit 26 designates the plurality of execution histories selected by the user.

FIG. 14 is a diagram illustrating an example of designation of the execution histories. The user refers to a selection screen for the execution histories illustrated in FIG. 14, and selects a plurality of execution histories. In the example of FIG. 14, the execution history A and the execution history B are selected. In this case, the execution history designation unit 26 designates the execution history A and the execution history B. Note that "Func_B" in FIG. 14 indicates that the function designated by the structural element designation unit 7 is "Func_B".

The display information calculation unit 27 calculates the display information in the plurality of execution histories designated by the execution history designation unit 26. Specifically, the display information calculation unit 27 calculates the display information including the sum of the weights of each function and dependency relationship in each execution history designated by the execution history designation unit 26.

For example, when the execution history designation unit 26 designates the execution history A15 and the execution history B16, the display information calculation unit 27 calculates the display information weighed by the sum of the execution count A and the execution count B of each of the function table 17 and the dependency table 18 included in the analysis information 9. In this case, in the function table 17, the weight of "Func_A" is "3", and the weight of "Func_C" is "1". The same applies to the dependency relationship table 18.

Figure 15:
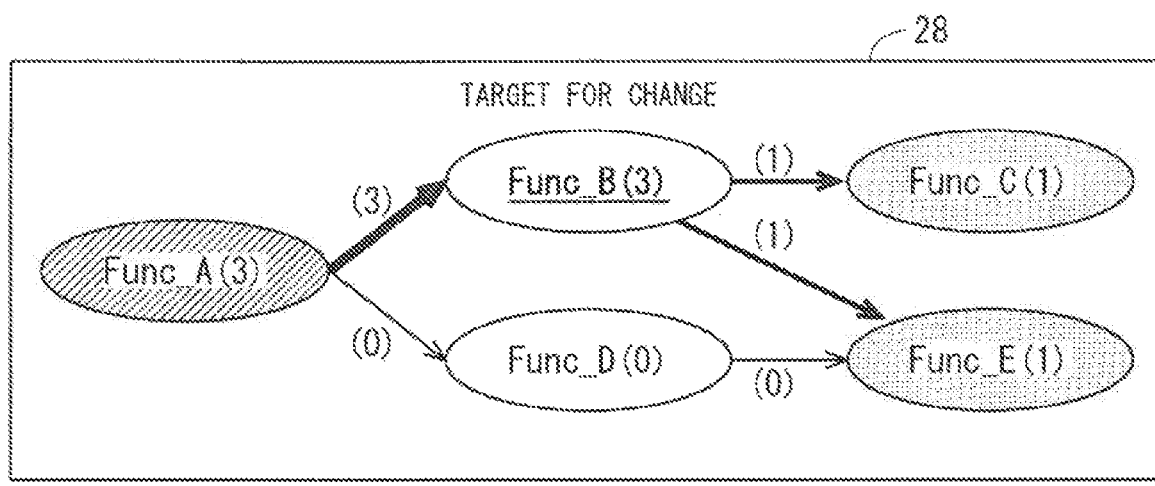
FIG. 15 is an example of a graph a display displays according to the third embodiment of the present invention.

FIG. 15 is an example of the graph 28 displayed by the display 10. The graph 28 is a call graph. Note that the example of FIG. 15 illustrates, as illustrated in FIG. 14, a case where the structural element designation unit 7 designates "Func_B" as the function name and the execution history designation unit 26 designates "Execution History A" and "Execution History B".

In FIG. 15, for example, "Func_B (3)" shows that the sum of the weights of the execution count A and the execution count B of the function name "Func_B" is "3". Further, for example, "(1)" between "Func_B" and "Func_C" shows that the sum of the weights of the execution count A and the execution count B of the dependency relationship where the dependency source is "Func_B" and the dependency destination is "Func_C" is "1". The deepness of color of the node of the function and the thickness of the arrow line indicating the dependency relationship in FIG. 15 may be determined by the same method as in the second embodiment.

From the above, according to the third embodiment, the analysis can be conducted, with a plurality of execution histories being as one virtually connected execution history, by selecting a plurality of divided execution histories. In addition, even if different processes are adopted, the use of a plurality of execution histories allows to display the sum of the weights of each function and each dependency relationship in each execution history in a graph; therefore, accurate analysis results can be displayed.

Fourth Embodiment

Figure 16:
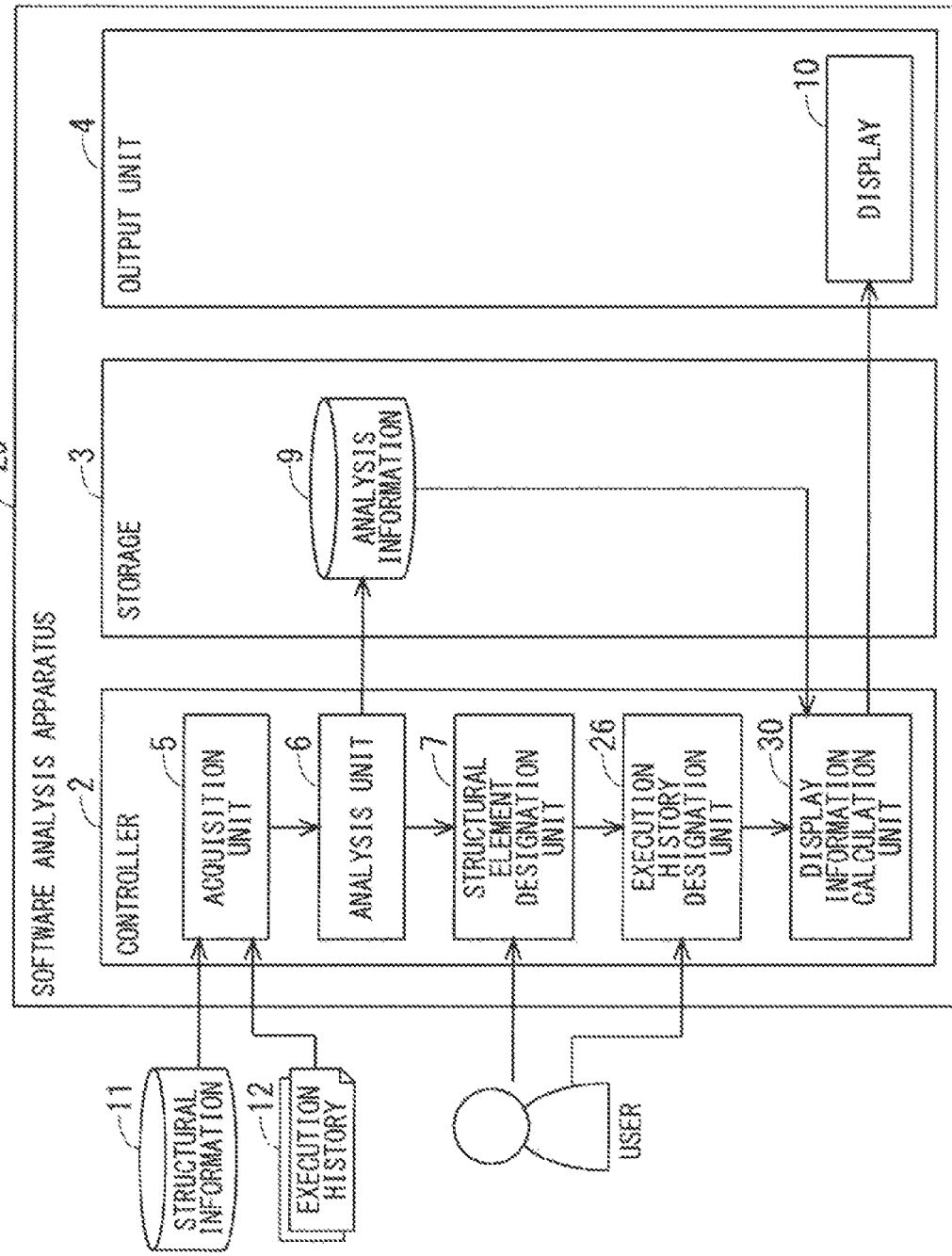
FIG. 16 is a block diagram illustrating an example of a configuration of a software analysis apparatus according to the fourth embodiment of the present invention.

FIG. 16 is a block diagram illustrating an example of a configuration of a software analysis apparatus 29 according to the fourth embodiment of the present invention.

As illustrated in FIG. 16, the software analysis apparatus 29 includes a display information calculation unit 30. Other basic configurations and operations thereof are the same as those in the third embodiment; therefore, detailed description thereof will be omitted here.

As in the same with the third embodiment, the execution history designation unit 26 designates a plurality of execution histories to be used in the analysis among the plurality of execution histories 12 acquired by the acquisition unit 5. In this case, as illustrated in FIG. 14, the execution history designation unit 26 designates the execution history A and the execution history B selected by the user.

The display information calculation unit 30 calculates the display information including the weights of each function and dependency relationship executed in all of each execution history designated by the execution history designation unit 26. The weights of the functions and dependency relationships executed in all of each execution history are also referred to as common information.

For example, when the execution history designation unit 26 designates the execution history A15 and the execution history B16, the display information calculation unit 30 sets the weight of the function whose values of both the execution count A and the execution count B in the function table 17 included in the analysis information 9 is 1 or more to "1" and the weights of the other functions to "0". That is, the weight of the function executed in both the execution history A15 and the execution history B16 is set to "1", and the weight of the other functions is set to "0". The same applies to the dependency relationship table 18.

Figure 17:
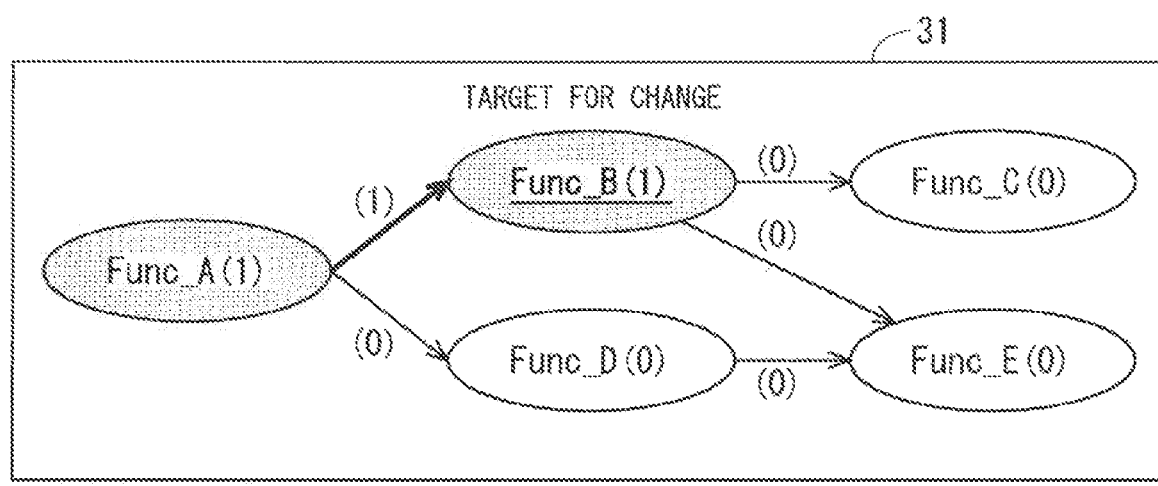
FIG. 17 is an example of a graph a display displays according to the fourth embodiment of the present invention.

FIG. 17 is an example of a graph 31 displayed by the display 10. The graph 31 is a call graph. Note that the example of FIG. 17 illustrates, as illustrated in FIG. 14, a case where the structural element designation unit 7 designates "Func_B" as the function name and the execution history designation unit 26 designates "Execution History A" and "Execution History B".

In FIG. 17, for example, "Func_B (1)" indicates that "Func_B" was executed at least once in both the execution history A15 and the execution history B16. Further, for example, "(1)" between "Func_A" and "Func_B" indicates that the dependency relationship has been executed at least once, where the dependency source is "Func_A" and the dependency destination is "Func_B" in both the execution history A15 and the execution history B16. The deepness of color of the node of the function and the thickness of the arrow line indicating the dependency relationship in FIG. 17 may be determined by the same method as in the second embodiment.

From the above, according to the fourth embodiment, the common process in the plurality of execution histories having different operations can be displayed. Therefore, this clarifies the common process and the branching of the process in the processing ahead, allowing the user to reduce the man-hours required for understanding the software.

Fifth Embodiment

Figure 18:
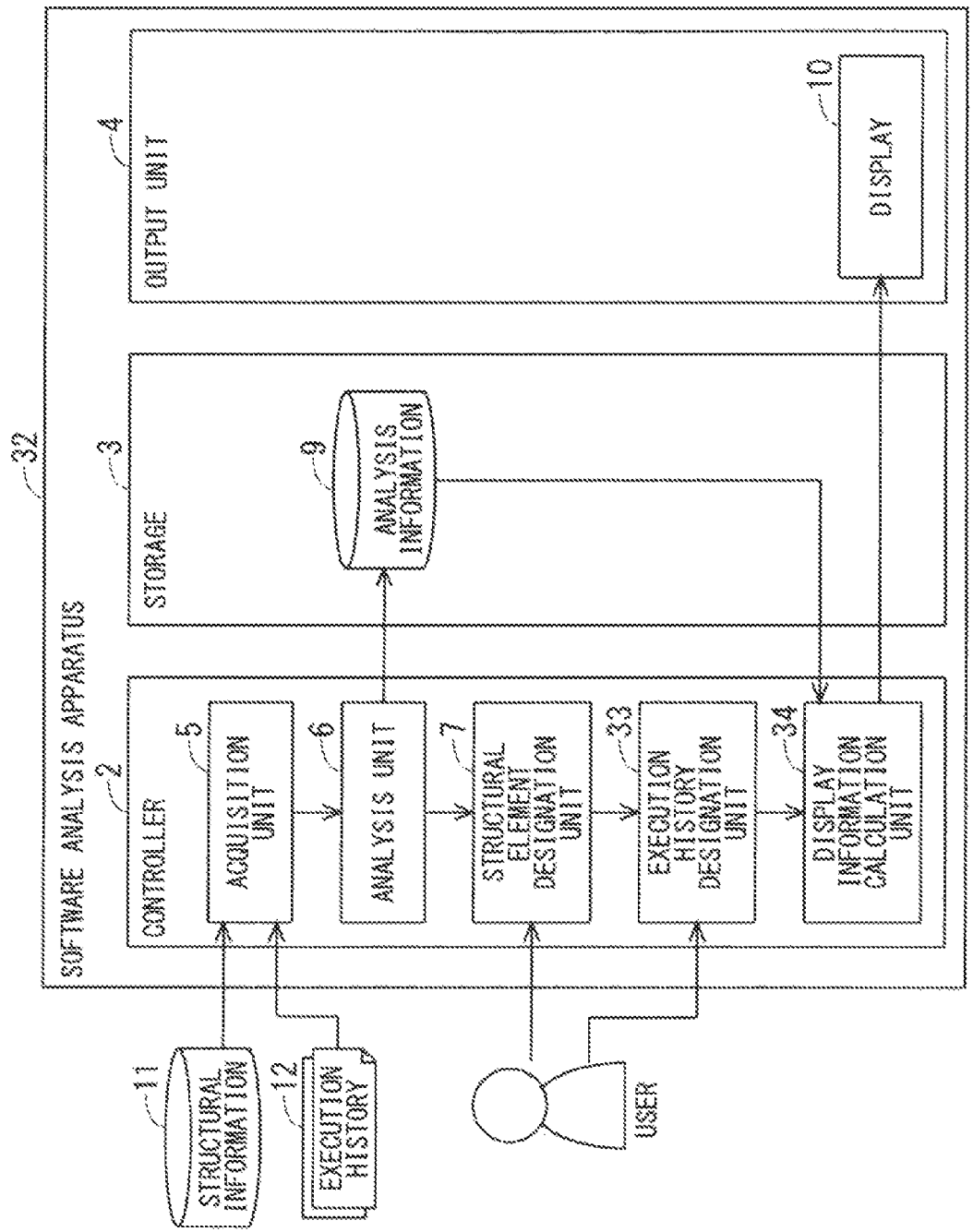
FIG. 18 is a block diagram illustrating an example of a configuration of a software analysis apparatus according to the fifth embodiment of the present invention.

FIG. 18 is a block diagram illustrating an example of a configuration of a software analysis apparatus 32 according to the fifth embodiment of the present invention.

As illustrated in FIG. 18, the software analysis apparatus 32 includes an execution history designation unit 33 and a display information calculation unit 34. Other basic configurations and operations thereof are the same as those in the second embodiment; therefore, detailed description thereof will be omitted here.

The execution history designation unit 33 designates two execution histories to be used in the analysis among the plurality of execution histories 12 acquired by the acquisition unit 5. Specifically, the execution history designation unit 33 designates two execution histories selected by the user.

FIG. 19 is a diagram illustrating an example of designation of the execution histories. The user refers to a selection screen for the execution histories of illustrated in FIG. 19, and selects two execution histories. In the example of FIG. 19, the execution history A is selected as a first execution history and the execution history B is selected as a second execution history. In this case, the execution history designation unit 33 designates the execution history A and the execution history B. Note that "Func_B" in FIG. 19 indicates that the function designated by the structural element designation unit 7 is "Func_B".

The display information calculation unit 34 calculates the display information in the plurality of execution histories designated by the execution history designation unit 33. Specifically, the display information calculation unit 34 calculates display information including difference information indicating a difference between the weights of each function and each dependency history in the first execution history and the weights of each function and each dependency history in the second execution history.

For example, when the execution history designation unit 33 designates the execution history A15 and the execution history B16, the display information calculation unit 34 sets the weight in which the execution count A is 0 and the execution count B is 1 or more in the function table 17 included in the analysis information 9 to "1" and the weights of the other functions to "0". That is, the weight of "Func_E" is "1", and the weight of the other functions is "0".

The same applies to the dependency relationship table 18. That is, the weight of the dependency relationship in which the dependency source is "Func_B" and the dependency destination is "Func_E" is "1", and the weights of the other dependency relationships are "0".

Figure 20:
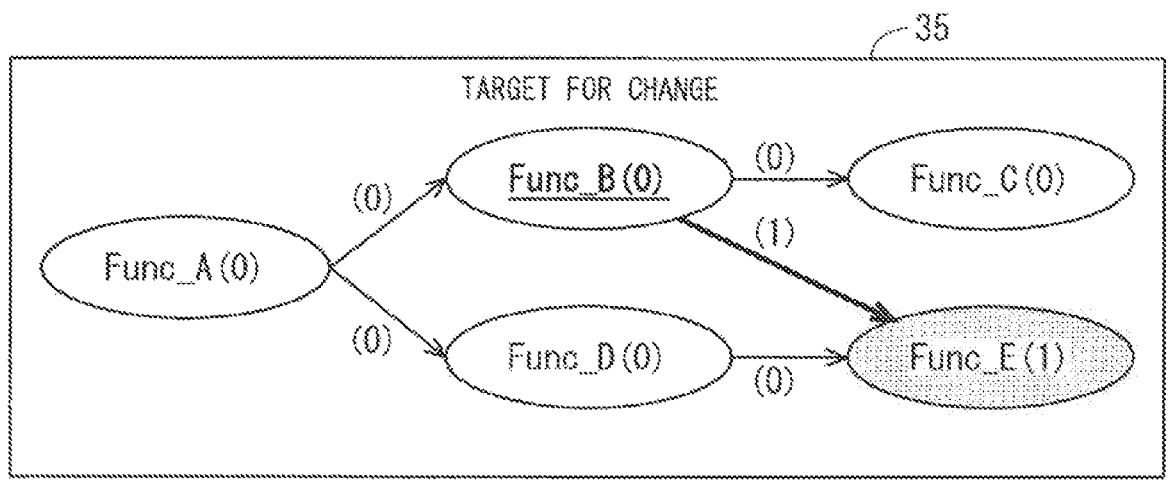
FIG. 20 is an example of a graph a display displays according to the fifth embodiment of the present invention.

FIG. 20 is an example of a graph 35 displayed by the display 10. The graph 35 is a call graph. Note that the example of FIG. 20 illustrates, as illustrated in FIG. 19, a case where the structural element designation unit 7 designates "Func_B" as the function name and the execution history designation unit 33 designates "Execution History A" as the first execution history and designates "Execution History B" as the second execution history.

In FIG. 20, for example, "Func_E (1)" indicates that the execution count A is 0 and the execution count B is 1 or more. Further, for example, "(1)" between "Func_B" and "Func_E" shows that, in the dependency relationship in which the dependency source is "Func_B" and the dependency destination is "Func_E", the execution count A is 0 and the execution count B is 1 or more. The deepness of color of the node of the function and the thickness of the arrow line indicating the dependency relationship in FIG. 20 may be determined by the same method as in the second embodiment.

From the above, according to the fifth embodiment, the difference between the plurality of execution histories having been executed different operations can be displayed. For example, suppose that regular processes are executed in many execution histories, and irregular processes are executed in only some execution histories. In this case, by displaying a difference from a regular process, for the irregular processing, from which function started the irregular process, and what route the irregular process took can be displayed.

Sixth Embodiment

Figure 21:
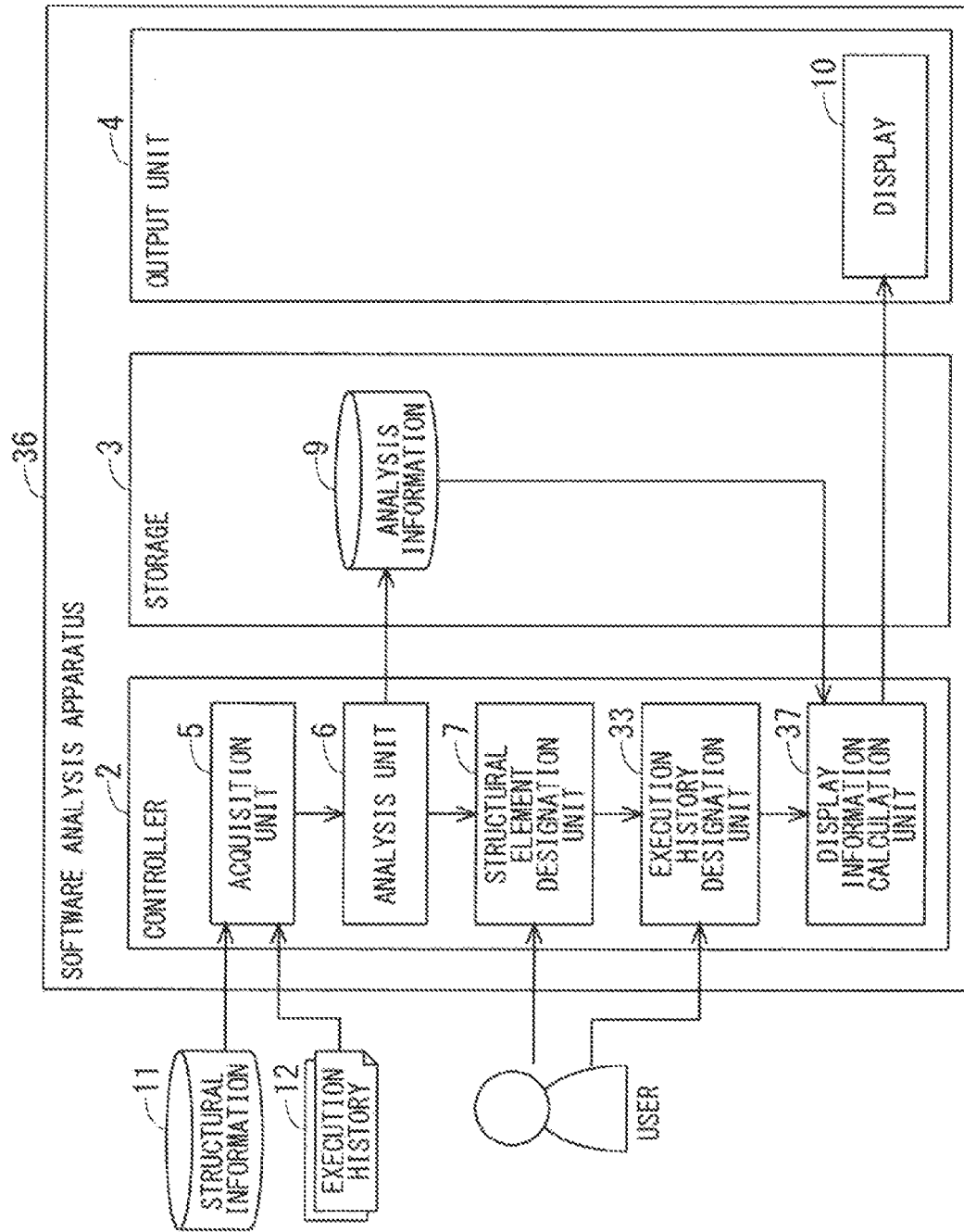
FIG. 21 is a block diagram illustrating an example of a configuration of a software analysis apparatus according to the sixth embodiment of the present invention.

FIG. 21 is a block diagram illustrating an example of a configuration of a software analysis apparatus 36 according to the sixth embodiment of the present invention.

As illustrated in FIG. 21, the software analysis apparatus 36 includes a display information calculation unit 37. Other basic configurations and operations thereof are the same as those in the fifth embodiment; therefore, detailed description thereof will be omitted here.

As in the display information calculation unit 34 described in the fifth embodiment, the display information calculation unit 37 sets the weight in which the execution count A is 0 and the execution count B is 1 or more in the function table 17 included in the analysis information 9 to "1" and the weights of the other functions to "0". At this time, the display information calculation unit 37 makes the function whose weight is "1" and its weight include in the display information. The same applies to the dependency relationship table 18.

For example, as in the fifth embodiment, the weight of "Func_E" is "1", and the weights of the other functions are "0". At this time, the display information calculation unit 37 provides the display 10 with the display information including "Func_E" and its weigh. The same applies to the dependency relationship table 18.

Figure 22:
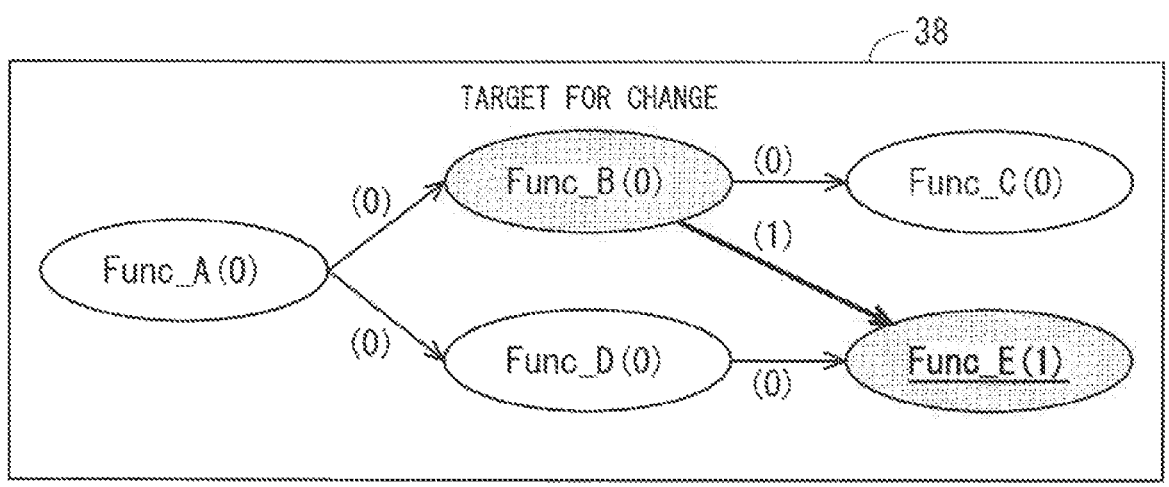
FIG. 22 is an example of a graph a display displays according to the sixth embodiment of the present invention.

FIG. 22 is an example of a graph 38 displayed by the display 10. The graph 38 is a call graph. Note that the example of FIG. 22 illustrates, as illustrated in FIG. 19, a case where the structural element designation unit 7 designates "Func_B" as the function name and the execution history designation unit 33 designates "Execution History A" as the first execution history and designates "Execution History B" as the second execution history.

In FIG. 22, "Func_E (1)" is highlighted. Further, the arrow line indicating the dependency relationship between "Func_B" and "Func_E" is a thick line.

From the above, according to the sixth embodiment, by displaying the functions having the differences between the different execution histories and their weights, the impact range of the functions having the differences can be displayed in a graph.

Hardware Configuration

Figure 23:
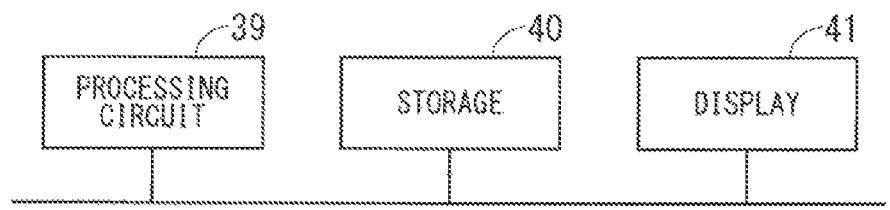
FIG. 23 is a block diagram illustrating an example of a hardware configuration of the software analysis apparatus according to the embodiments of the present invention.

FIG. 23 is a block diagram illustrating an example of a hardware configuration of a software analysis apparatus 1 according to the first embodiment. In the following, although the software analysis apparatus 1 according to the first embodiment will be described as an example, the same applies to the software analysis apparatus 20 according to the second embodiment, the software analysis apparatus 25 according to the third embodiment, the software analysis apparatus 29 according to the fourth embodiment, the software analysis apparatus 32 according to the fifth embodiment, and the software analysis apparatus 36 according to the sixth embodiment.

The storage 3 in the software analysis apparatus 1 is a storage device 40, and the output unit 4 is a display 41. Each function of the acquisition unit 5, the analysis unit 6, the structural element designation unit 7, and the display information calculation unit 8 in the software analysis apparatus 1 is implemented by the processing circuit 39. That is, the software analysis apparatus 1 includes a processing circuit 39 that acquires structural information and a plurality of execution histories, analyzes the weights of the plurality of structural elements and the weights of the dependency relationships, designates the structural elements, and calculates the display information. For the processing circuit 39, dedicated hardware may be applied, or a processor (also referred to as a Central Processing Unit (CPU), a central processing unit, a processing unit, an arithmetic unit, a microprocessor, a microcomputer, a Digital Signal Processor (DSP)) that executes a program stored in a memory may also be applied.

When the dedicated hardware is applied to the processing circuit 39, a processing circuit 39 corresponds, for example, to a single circuit, a composite circuit, a programmed processor, a parallel programmed processor, an Application Specific Integrated Circuit (ASIC), or a Field-Programmable Gate Array (FPGA), or the combination thereof. While each function of the acquisition unit 5, the analysis unit 6, the structural element specification unit 7, and the display information calculation unit 8 may be implemented by the processing circuit 39, respectively, or may also be implemented by one processing circuit 39.

Figure 24:
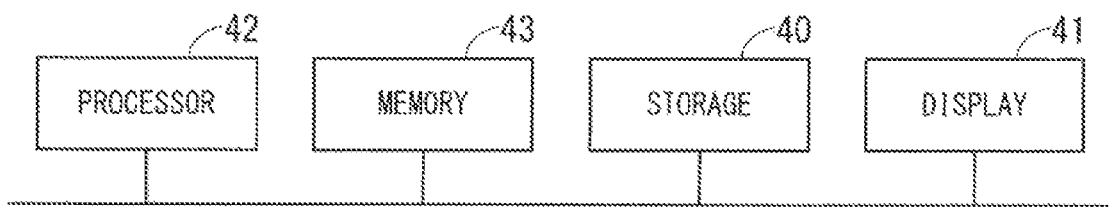
FIG. 24 is a block diagram illustrating an example of a hardware configuration of the software analysis apparatus according to the embodiments of the present invention.

When the processing circuit 39 is applied to the processor 42 illustrated in FIG. 24, each function of the acquisition unit 5, the analysis unit 6, the structural element designation unit 7, and the display information calculation unit 8 is implemented by software, firmware, or a combination of software and firmware. The software or firmware is written as a program and stored in a memory 43. The processor 42 implements each function by reading and executing the program recorded in the memory 43. That is, the software analysis apparatus 1 includes the memory 43 for storing the program which, eventually, executes the steps of acquiring the structural information and the plurality of execution histories, analyzing the weights of a plurality of structural elements and weights of dependency relationships, designating the structural elements, and calculating display information. Further, it can be said that these programs are programs to execute the procedure and method of the acquisition unit 5, the analysis unit 6, the structural element designation unit 7, and the display information calculation unit 8. Here, the memory may be, for example, a non-volatile or volatile semiconductor memory, such as a Random Access Memory (RAM), a Read Only Memory (ROM), a flash memory, an Erasable Programmable Read Only Memory (EPROM), an Electrically Erasable Programmable Read Only Memory (EEPROM), or the like, a magnetic disk, a flexible disk, an optical disk, a compact disk, a digital versatile disc (DVD) or the like, or any storage medium used in the future.

For each function of the acquisition unit 5, the analysis unit 6, the structural element designation unit 7, and the display information calculation unit 8, part of functions thereof may be realized by dedicated hardware and another part of the components is realized by software or the like.

Accordingly, the processing circuit can realize the above each function by hardware, software, firmware, or a combination thereof.

In the present invention, the embodiments can be combined, appropriately modified or omitted, without departing from the scope of the invention.

While the invention has been described in detail, the foregoing description is in all aspects illustrative and not restrictive. It is therefore understood that numerous modifications and variations can be devised without departing from the scope of the invention.

EXPLANATION OF REFERENCE SIGNS

1 software analysis apparatus, 2 controller, 3 storage, 4 output unit, 5 acquisition unit, 6 analysis unit, 7 structural element designation unit, 8 display information calculation unit, 9 analysis information, 10 display, 11 structural information, 12 execution history, 13 function list, 14 dependency relationship list, 15 execution history A, 16 execution history B, 17 function table, 18 dependency relationship table, 19 graph, 20 software analysis apparatus, 21 execution history designation unit, 22 display information calculation unit, 23, 24 graph, 25 software analysis apparatus, 26 execution history designation unit, 27 display information calculation unit, 28 graph, 29 software analysis apparatus, 30 display information calculation unit, 31 graph, 32 software analysis apparatus, 33 execution history designation unit, 34 display information calculation unit, 35 graph, 36 software analysis apparatus, 37 display information calculation unit, 38 graph, 39 processing circuit, 40 storage, 41 display, 42 processor, 43 memory.

The invention claimed is:

1. A software analysis apparatus comprising:
a processor to execute a program, and a memory to store the program which, when executed by the processor, performs processes of,
acquiring structural information of software and a plurality of execution histories of the software;
analyzing weights of a plurality of structural elements included in the structural information and weights of dependency relationships of each of the plurality of structural elements based on the structural information and the plurality of execution histories which have been acquired;
designating one of the structural element among the structural elements included in the structural information as a designated structure element;
calculatinq display information including a dependency structural element being a structural element having a dependency relationship with the designated structure element and a weight of the dependency structural element, and a correspondence between the designated structural element and the dependency structural element and a weight of the correspondence; and
displaying the display information which has been calculated.

2. The software analysis apparatus according to claim 1, further comprising:
designating one of the execution histories among the plurality of execution histories which have been acquired as a designated execution history, wherein
the calculating process comprises calculating the display information in the one designated execution history which has been designated.

3. The software analysis apparatus according to claim 1, further comprising:
designating a plurality of execution histories among the plurality of execution histories which have been acquired as designated execution histories, wherein
the calculating process comprises calculating the display information including a sum of a weight of each of the designated structural element and the dependency structural element in each designated execution history which has been designated and a sum of a weight of the designated element and the dependency relationship of the dependency structural element, and
the displaying process comprises displaying the display information in accordance with each of the weights.

4. The software analysis apparatus according to claim 1, further comprising:
designating a plurality of execution histories among the plurality of execution histories which have been acquired as designated execution histories, wherein
the calculating process comprises including respective weights of the designated structural element executed in all of each designated execution history which has been designated, the dependency structural element, and the dependency relationship in the display information as common information, and
the displaying process comprises displaying the common information with highlighting.

5. The software analysis apparatus according to claim 1, further comprising:
designating a first execution history and a second execution history among the plurality of execution histories which have been acquired, wherein
the calculating process comprises including difference information indicating a difference between a weight of each of the designated structural element, the dependency structural element, and the dependency relationship in the first execution history and a weight of each of the designated structural element, the dependency structural element, and the dependency relationship in the second execution history, and
the displaying process comprises displaying the difference information with highlighting.

6. The software analysis apparatus according to claim 5, wherein
the displaying process comprises displaying at least one of the designated structural element and the dependency structural element having the difference and the weight thereof with highlighting.

\* \* \* \* \*